US012812635B2

(12) United States Patent
Christoffersson et al.

(10) Patent No.: US 12,812,635 B2
(45) Date of Patent: Nov. 24, 2026

(54) MECHANISMS FOR CG-SDT ASSOCIATED WITH MULTIPLE SSB BEAMS

(71) Applicant: Telefonaktiebolaget LM Ericsson (publ), Stockholm (SE)

(72) Inventors: Jan Christoffersson, Luleå (SE); Henrik Enbuske, Stockholm (SE); Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 306 days.

(21) Appl. No.: 18/570,219

(22) PCT Filed: May 25, 2022

(86) PCT No.: PCT/SE2022/050505
§ 371 (c)(1),
(2) Date: Dec. 14, 2023

(87) PCT Pub. No.: WO2023/277753
PCT Pub. Date: Jan. 5, 2023

(65) Prior Publication Data

US 2024/0267914 A1 Aug. 8, 2024

(30) Foreign Application Priority Data

Jul. 2, 2021 (WO) ................ PCT/CN2021/104319

(51) Int. Cl.
*H04W 72/1268* (2023.01)
*H04L 5/00* (2006.01)

(52) U.S. Cl.
CPC ....... *H04W 72/1268* (2013.01); *H04L 5/0048* (2013.01)

(58) Field of Classification Search
CPC . H04W 72/1268; H04W 72/21; H04W 76/27; H04L 5/0048; H04L 5/0044; H04L 5/0053
(Continued)

(56) References Cited

U.S. PATENT DOCUMENTS 11,546,908 B2 * 1/2023 Rege ................. H04W 74/0833
11,895,634 B2 * 2/2024 Liu ........................ H04L 5/0092
(Continued)

FOREIGN PATENT DOCUMENTS

WO WO-2021127606 A1 * 6/2021 ............ H04W 72/51
WO WO-2021229527 A1 * 11/2021 ........... H04L 5/0023

OTHER PUBLICATIONS

Author Unknown, "Technical Specification Group Radio Access Network; NR; Physical layer procedures for control (Release 16)," Technical Specification 38.213, Version 16.6.0, Jun. 2021, 3GPP Organizational Partners, 187 pages.
(Continued)

*Primary Examiner* — Mahendra R Patel
(74) *Attorney, Agent, or Firm* — Sonoda & Kobayashi Intellectual Property Law; Sarvajit S. Patil

(57) ABSTRACT

Methods and apparatuses for transmission and reception of uplink data. A method performed by a user equipment for uplink data transmission of uplink data to a network node comprises selecting a transmission resource associated with a synchronization signal block (SSB). The method further comprises determining whether to select one or more further transmission resources associated with SSBs. The method also comprises transmitting uplink data using the transmission resource and, if selected, the one or more further transmission resources.

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0110040 | A1* | 4/2015 | Zhao ................. | H04W 72/1268 370/328 |
| 2020/0274606 | A1* | 8/2020 | Kang et al. .......... | H04B 7/0626 |
| 2021/0050892 | A1* | 2/2021 | Park ...................... | H04B 7/0696 |
| 2021/0289558 | A1* | 9/2021 | Han .................. | H04W 52/0229 |
| 2021/0392593 | A1* | 12/2021 | Nagarajan ............. | H04L 5/0048 |
| 2022/0061097 | A1* | 2/2022 | Kwak et al. ......... | H04B 17/318 |
| 2022/0322252 | A1* | 10/2022 | Chen ........................ | H04L 5/001 |
| 2023/0232426 | A1* | 7/2023 | Liu et al. ............. | H04B 7/0621 370/330 |

OTHER PUBLICATIONS

Author Unknown, “Technical Specification Group Radio Access Network; NR; User Equipment (UE) procedures in Idle mode and RRC Inactive state (Release 16),” Technical Specification 38.304, Version 16.4.0, Mar. 2021, 3GPP Organizational Partners, 39 pages.
Author Unknown, “Technical Specification Group Radio Access Network; NR; Medium Access Control (MAC) protocol specification (Release 16),” Technical Specification 38.321, Version 16.4.0, Mar. 2021, 3GPP Organizational Partners, 157 pages.
Author Unknown, “Technical Specification Group Radio Access Network; NR; Radio Resource Control (RRC) protocol specification (Release 16),” Technical Specification 38.331, Version 16.4.1, Mar. 2021, 3GPP Organizational Partners, 949 pages.
Ericsson, “R1-2105508: Discussion on RAN1 aspects for NR small data transmissions in INACTIVE state,” 3GPP TSG-RAN WG1 Meeting #105-e, May 10-27, 2021, Electronic Meeting, 4 pages.
Ericsson, “R2-2101175: Details of CG based SDT,” 3GPP TSG-RAN WG2 #113e, Jan. 25-Feb. 5, 2021, Electronic Meeting, 5 pages.
Huawei, et al., “R1-2101267: RA and CG based small data transmission,” 3GPP TSG RAN WG1 Meeting #104-e, Jan. 25-Feb. 5, 2021, Electronic Meeting, 7 pages.
Qualcomm Incorporated, “R2-2101233: Discussion on CG based NR small data transmission,” 3GPP TSG-RAN WG2 Meeting #113e, Jan. 25-Feb. 5, 2020, Electronic Meeting, 5 pages.
ZTE Corporation, “RP-210870: Work Item on NR smalldata transmission in Inactive state,” 3GPP TSG RAN Meeting #91e, 2021, Electronic Meeting, 5 pages.
International Search Report and Written Opinion for International Patent Application No. PCT/SE2022/050505, mailed Aug. 9, 2022, 11 pages.

* cited by examiner

MECHANISMS FOR CG-SDT ASSOCIATED WITH MULTIPLE SSB BEAMS

This application is a 35 U.S.C. § 371 national phase filing of International Application No. PCT/SE2022/050505, filed May 25, 2022, which claims the benefit of International Application No. PCT/CN2021/104319, filed Jul. 2, 2021, the disclosures of which are incorporated herein by reference in their entireties.

TECHNICAL FIELD

Embodiments of the present disclosure relate to methods, user equipments and network nodes, and particularly methods, user equipments and network nodes for transmission and reception of uplink data.

BACKGROUND

New Radio (NR) small data transmissions in the Radio Resource Control (RRC) Inactive state A new 3rd Generation Partnership Project (3GPP) Work Item (WI) RP-210870 'New Work Item on NR small data transmissions in INACTIVE state' has been approved in 3GPP with the focus of optimizing the transmission for small data payloads by reducing the signaling overhead. The WI is available at https://www.3gpp.org/ftp/TSG_RAN/TSG_RAN/TSGR_91e/Docs/RP-210870.zip as of 29 Jun. 2021. The WI contains objectives such as those discussed below (text quoted from WI):

"This work item enables small data transmission in RRC_INACTIVE state as follows:

- For the RRC_INACTIVE state:
  - UL small data transmissions for RACH-based schemes (i.e. 2-step and 4-step RACH):
    - General procedure to enable transmission of small data packets from INACTIVE state (e.g. using MSGA or MSG3) [RAN2]
    - Enable flexible payload sizes larger than the Rel-16 CCCH message size that is possible currently for INACTIVE state for MSGA and MSG3 to support UP data transmission in UL (actual payload size can be up to network configuration) [RAN2]
    - Context fetch and data forwarding (with and without anchor relocation) in INACTIVE state for RACH-based solutions [RAN2, RAN3]
  - Note 1: The security aspects of the above solutions should be checked with SA3
  - Transmission of UL data on pre-configured PUSCH resources (i.e. reusing the configured grant type 1)—when TA is valid
    - General procedure for small data transmission over configured grant type 1 resources from INACTIVE state [RAN2]
    - Configuration of the configured grant type1 resources for small data transmission in UL for INACTIVE state [RAN2]
  - Specify RRM core requirements for small data transmission in RRC_INACTIVE, if needed [RAN4]"

For Narrow Band Internet of Things (NB-IoT) and Long Term Evolution for Machines (LTE-M) similar signaling optimizations for small data have been introduced through Rel-15 Early Data Transmission (EDT) and Rel-16 Preconfigured Uplink Resources (PUR). The support for small data in NR may share some similarities with EDT and/or PUR, however for Rel-17 NR Small Data is only to be supported for the RRC INACTIVE state, including 2-step Random Access Channel (RACH) based small data, and should also function for regular complexity Mobile Broadband (MBB) UEs. Both 2-step RACH and MBB support mobile originated (MO) traffic only.

In the context of Small Data Transmission (SDT) it is useful to consider the possibility of transmitting subsequent data, that is transmission of further segments of the data that cannot fit in the Msg3 Transport Block. Such segments of data can be transmitted either in a RRC_CONNECTED state (as in legacy after the 4-step RACH procedure has been completed), or they can be transmitted in a RRC_INACTIVE state before the UE transitions to a RRC_CONNECTED state. Where a RRC_CONNECTED state is used the transmission may be more efficient than where a RRC_INACTIVE state is used as the gNB and UE are appropriately configured based on the current UE channel conditions. Where a RRC_INACTIVE state is used several optimization are not in place yet, especially if the UE has moved while not connected, and also the transmission may collide with the transmission from other UEs as the contention has not been resolved.

Discussions relating to SDT in 3GPP meeting RAN2 #111-e (details available at https://portal.3gpp.org/Home.aspx #/meeting?MtgId=38709 as of 1 Jul. 2021) resulted in the following relevant agreements:

- Small data transmission with RRC message is supported as baseline for RA-based and CG based schemes
- The 2-step RACH or 4-step RACH should be applied to RACH based uplink small data transmission in RRC_INACTIVE
- The uplink small data can be sent in MSGA of 2-step RACH or msg3 of 4-step RACH.
- Small data transmission is configured by the network on a per DRB basis
- Data volume threshold is used for the UE to decide whether to do SDT or not. FFS how we calculate data volume.
- FFS if an "additional SDT specific" RSRP threshold is further used to determine whether the UE should do SDT
- UL/DL transmission following UL SDT without transitioning to RRC_CONNECTED is supported
- When UE is in RRC_INACTIVE, it should be possible to send multiple UL and DL packets as part of the same SDT mechanism and without transitioning to RRC_CONNECTED on dedicated grant. FFS on details and whether any indication to network is needed Discussions relating to SDT in 3GPP meeting RAN2 #112-e (details available at https://portal.3gpp.org/Home.aspx #/meeting?MtgId=39298 as of 1 Jul. 2021) resulted in the following agreements related to SDT using Configured Grant (CG) in RRC_INACTIVE states:

- "The configuration of configured grant resource for UE uplink small data transfer is contained in the RRCRelease message. FFS if other dedicated messages can configure CG in INACTIVE CG. Configuration is only type 1 CG with no contention resolution procedure for CG.
- The configuration of configured grant resource can include one type 1 CG configuration. FFS if multiple configured CGs are allowed
- A new TA timer for TA maintenance specified for configured grant based small data transfer in RRC_INACTIVE should be introduced. FFS on the procedure, the validity of TA, and how to handle expiration of TA timer. The TA timer is configured together with the CG configuration in the RRCRelease message.

The configuration of configured grant resource for UE small data transmission is valid only in the same serving cell. FFS for other CG validity criteria (e.g. timer, UL/SUL aspect, etc)

The UE can use configured grant based small data transfer if at least the following criteria is fulfilled (1) user data is smaller than the data volume threshold; (2) configured grant resource is configured and valid; (3) UE has valid TA. FFS for the candidate beam criteria.

From RAN2 point of view: An association between CG resources and SSBs is required for CG-based SDT. FFS up to RAN1 how the association is configured or provided to the UE. Send an LS to RAN1 to start the discussion on how the association can be made. Mention that one option RAN2 considered was explicit configuration with RRC Release message A SS-RSRP threshold is configured for SSB selection. UE selects one of the SSB with SS-RSRP above the threshold and selects the associated CG resource for UL data transmission."

Additional discussions in RAN2 #113-e (details available at https://portal.3gpp.org/Home.aspx #/meeting?MtgId=39299 as of 1 Jul. 2021) resulted in the following agreements and working assumptions:

Agreements:

1. CG-SDT resource configuration is provided to UEs in RRC_Connected only within the RRCRelease message, i.e. no need to also include it in RRCReconfiguration message
2. CG-PUSCH resources can be separately configured for NUL and SUL. FFS if we allow them at the same time. This depends on the alignments CRs for Rel-16.
3. RRCRelease message is used to reconfigure or release the CG-SDT resources while UE is in RRC_INACTIVE
4. For CG-SDT the subsequent data transmission can use the CG resource or DG (i.e dynamic grant addressed to UE's C-RNTI). Details on C-RNTI, can be the same as the previous C-RNTI or may be configured explicitly by the network can be discussed in stage 3
5. TAT-SDT is started upon receiving the TAT-SDT configuration from gNB, i.e. RRCrelease message, and can be (re)started upon reception of TA command.
6. From RAN2 point of view, assume similar to PUR, that we introduce a TA validation mechanism for SDT based on RSRP change, i.e. RSRP-based threshold(s) are configured. Ask RAN1 to confirm. FFS on how to handle CG configuration when TA expires or when is invalid due to RSRP threshold. Details of the TA validation procedure can be further discussed.
7. As a baseline assumption, it's a network configuration issue whether to support multiple CG-SDT configurations per carrier in RRC_INACTIVE (i.e. we will not restrict network configuration for now).
8. FFS Discuss further in stage 3 how to specify the agreement that CG-SDT resources are only valid in one cell (i.e. cell in which RRCRelease is received)
9. UE releases CG-SDT resources when TAT expires in RRC_Inactive state
10. For RA-SDT, up to two preamble groups (corresponding to two different payload sizes for MSGA/MSG3) may be configured by the network
11. If RACH procedure is initiated for SDT (i.e. RA-SDT initiated), the UE first performs RACH type selection as specified in MAC (i.e. Rel-16). FFS whether threshold is SDT specific or not
12. RAN2 continues to progress the work based the separate RACH resources for SDT (i.e. explicit mechanisms to support common resources won't be pursued unless there is sufficient support for this. However, use of common RACH resources will not be precluded if possible via implementation
13. RAN2 design assumes that RRCRelease message is sent at the end to terminate the SDT procedure from RRC point of view. The RRCRelease sent at the end of the SDT may contain the CG resource (as per previous agreement). Write an LS to SA3 to explain SDT procedure and agreement.
14. The UE behaviour for handling of non-SDT data arrival after sending the first UL data packet is fully specified (i.e. not left to UE implementation)
15. FFS RAN2 will consider the additional option of using DCCH message to indicate arrival of non-SDT data (details to be discussed). Discussion will continue on all three options.
16. FFS: RSRP threshold to select between SDT and non-SDT procedure.
17. FFS also whether this RSRP threshold to select between SDT and non-SDT procedure is used for CG-SDT, RA-SDT, or both and whether the RSRP threshold is the same for CG-SDT and RA-SDT. FFS when the RSRP threshold check is made
18. FFS If both carriers can be selected and CG resources are available on one carrier only, does the UE select the carrier with CG?
19. For SDT, UE performs UL carrier selection (i.e. if SUL is configured in the cell, UL carrier selected based on RSRP threshold). FFS whether the RSRP threshold for carrier selection is specific to SDT)
20. If CG-SDT resources are configured on the selected UL carrier and are valid, then CG-SDT is chosen. Otherwise,
    - If 2 step RA-SDT resources are configured on the UL carrier and criteria to select 2 step RA SDT is met, then 2 step RA-SDT is chosen
    - else If 4 step RA-SDT resources are configured on the UL carrier and criteria to select 4 step RA SDT is met, then 4 step RA-SDT is chosen
    - else UE does not perform SDT (i.e. perform non-SDT resume procedure)
    - If both 2 step RA-SDT and 4 step RA-SDT resources are configured on the UL carrier, RA type selection is performed based on RSRP threshold.
        - FFS whether RSRP threshold for RA type selection is common or different for SDT and non SDT.
        - FFS what validity includes if we need to deal with CG resource availability delay?

Working Assumptions

1. Support configuring of SRB1 and SRB2 for small data transmission for carrying RRC and NAS messages.
2. Upon initiating RRC Resume procedure for SDT initiation (i.e. for first SDT transmission), the UE shall also resume SRB2 that is configured for SDT, in addition to SDT DRBs that are configured for SDT
3. RAN2 recommends to include SRB2 in WID Further agreements resulted from RAN2 #113bis-e (details available at https://portal.3gpp.org/Home.aspx #/meeting?MtgId=39300 as of 1 Jul. 2021):

1 RSRP threshold is used to select between SDT and non-SDT procedure, if configured (RSRP refers to the same RSRP measured for carrier selection).

2 RSRP threshold to select between SDT and non-SDT procedure is used for both CG-SDT and RA-SDT 3 RSRP threshold to select between SDT and non-SDT procedure is same for both CG-SDT and RA-SDT 4 RSRP threshold for carrier selection is specific to SDT (i.e. separately configured for SDT). This is optional for the network.

5 Confirm that cell selection mechanism is not modified

6 RSRP threshold for RA type selection is specific to SDT (i.e. separately configured for SDT)

7 Data volume threshold is the same for CG-SDT and RA-SDT (can be checked further in stage 3 if we obtain majority support)

8 FFS on the order and missing pieces (e.g. failure, fallback) of the high level procedure. The details of the procedures are left for stage 3. FFS on the procedure below, but copied for information.

A. Upon arrival of data only for DRB/SRB(s) for which SDT is enabled, the high level procedure for selection between SDT and non SDT procedure is as follows:
   If CG-SDT criteria is met: UE selects CG-SDT. UE initiate SDT procedure
   Else if RA-SDT criteria is met: UE selects RA-SDT. UE initiate SDT procedure
   Else: UE initiate non SDT procedure.

B. CG-SDT criteria is considered met, if all of the following conditions are met,
   1) available data volume <=data volume threshold
   2) RSRP is greater than or equal to a configured threshold
   FFS 3) CG-SDT resources are configured on the selected UL carrier and are valid C. RA-SDT criteria is considered met, if all of the following conditions are met,
   1) available data volume <=data volume threshold
   2) RSRP is greater than or equal to a configured threshold
   3) 4 step RA-SDT resources are configured on the selected UL carrier and criteria to select 4 step RA SDT is met; or 2 step RA-SDT resources are configured on the selected UL carrier and criteria to select 2 step RA SDT is met 9 Switching from SDT to non-SDT is supported.

10 FFS Switching from CG-SDT to RA-SDT is not allowed

11 UE switches from SDT to non-SDT in following cases:
   Case 1 (27/0): UE receive indication from network to switch to non-SDT procedure.
   Network can send RRCResume. FFS whether network can send indication in RAR/fallbackRAR/DCI to switch to non-SDT procedure.
   FFS Case 2 (18/9): Initial UL transmission (in msgA/Msg3/CG resources) fails configured number of times 12 gNB can only configure MN terminated MCG bearer type for SDT 13 Non-SDT radio bearers are only resumed upon receiving RRCResume (same as today)

14 Down-scope to two solutions (CCCH or DCCH) and ask SA3 about security issues (explain that CCCH message will be repeated in same cell and ask if there is a question)

15 The UE performs PDCP re-establishment implicitly, i.e. without explicit indication for PDCP re-establishment, when the UE initiates SDT procedure.

16 As in legacy, whether to support ROHC continuity is explicitly configured by the network.

17 PDCP duplication is not supported for SDT 18 connected mode DRX is not supported for SDT 19 PHR functionality is supported for SDT. FFS on PHR procedure 20 SR resource is not configured for SDT. When the BSR is triggered by SDT data, the UE will trigger RA because SR resource is not available, same as legacy 21 SDT failure detection timer is started upon initiation of SDT procedure 22 T319 legacy is not started if RRCResumeRequest or RRCResumeRequest1 is transmitted for SDT 23 T319 legacy stop conditions also apply to SDT failure detection timer 24 RRC re-establishment procedure is not supported for SDT 25 An LS is sent to SA3 to verify feasibility/impacts of re-using same NCC/I-RNTI value temporarily for RRC Resume procedure in new cell during SDT procedure (include same cell question from 502]

26 FFS-RAN2 to select between the following options for cell re-selection during ongoing SDT procedure next meeting: 1) UE transitions to IDLE, possibly performing high-layer retransmission (8/25); or 2) UE remains in INACTIVE and sends RRC Resume to new cell 27 FFS Upon SDT failure detection timer expiry, the same procedure as T319 expiry is used (e.g. transition to IDLE as in the case of expiry of the T319 timer and attempts RRC connection setup) (18/8)

28 CG-SDT resources can be configured at the same time on NUL and SUL

29 Implicit release of CG-SDT resource is not supported

30 UE start a window after CG/DG transmission for CG-SDT. FFS whether to design a new timer or to reuse an existing timer.

31 Support retransmission by dynamic grant for CG-SDT.

32 Support multiple HARQ processes for uplink CG-SDT.

33 CG resource availability delay is not considered as a criterion for CG validation.

34 UL carrier selection is performed before CG-SDT selection

35 FFS CG-SDT resource can be configured on BWPs other than initial BWP

Further agreements resulted from additional 3GPP RAN1 meetings, specifically:

Agreement in RAN1 #104bis-e meeting (details available at https://portal.3gpp.org/Home.aspx #/meeting?MtgId=39323 as of 1 Jul. 2021):

CG resources per CG configuration are associated with a set of SSB(s) configured by explicit signalling.
   FFS how to define an SSB-to-PUSCH resource mapping within the CG configuration.
   FFS specific changes to the CG configuration to support the additional SSB-to-PUSCH mapping, if any.

Agreements in RAN1 #105-e meeting (details available at https://portal.3gpp.org/Home.aspx #/meeting?MtgId=39325 as of 1 Jul. 2021):

The SSB-to-PUSCH resource mapping within the CG configuration is implicitly defined.
   The ordering of the SSB and CG PUSCH resources are to be captured in RAN1 spec.
      A PUSCH resource refers to a transmission occasion and a DMRS resource used for PUSCH transmission
      The ordering of the SSB can reuse from the SSB-to-RO mapping
      The ordering of CG PUSCH resources can reuse from that of MsgA PUSCH as much as possible FFS determination of mapping ratio and association period, e.g., explicitly signaled or implicitly derived FFS any limitation on the combination of the parameters for CG resources As mentioned above, in NR Rel-17 SDT is to be supported for the RRC INACTIVE state. The two main solutions for enabling SDT in RRC_INACTIVE state are: RACH-based SDT (i.e., transmitting small data on a Message A Physical Uplink Shared Channel, PUSCH, in a 2-step RACH procedure, or transmitting small data on Message 3 PUSCH in a 4-step RACH procedure) and Configured Grant (CG) based SDT (i.e., SDT over configured grant type-1 PUSCH resources for UEs in RRC inactive state.

The 4-step, 2-step RACH and configured grant type have already been specified as part of Rel-15 and Rel-16. So, the SDT features to be specified in NR Rel-17 may build on these building blocks to enable small data transmission in INACTIVE state for NR.

NR CG Based PUSCH Transmission

CG PUSCH resources may be defined as the PUSCH resources (time and frequency allocation, periodicity, etc.) configured in advance for the UE. When there is uplink data available at UE's buffer, the UE may start uplink transmission using the pre-configured PUSCH resources without waiting for an UL grant from a 5th generation base station (gNB), thus reducing the latency. NR supports CG type 1 PUSCH transmission and CG type 2 PUSCH transmission; for both types, the PUSCH resources are typically preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling. For Small Data transmissions, the CG type 1 may provide the baseline.

According to existing RAN2 agreements for CG-SDT, the CG-SDT configuration may be sent to the UE in a RRCRelease message, and may specify associations between CG resources (transmission opportunities) and SSBs. The UE, upon initiating the CG-SDT procedure, selects an synchronization signal block (SSB) with a synchronization signal reference signal received power (SS-RSRP) above a configured RSRP threshold. As illustrated in FIG. 1, a UE may have one or more SSBs that satisfy the SS-RSRP threshold criterion.

In FIG. 1, the circles indicate regions where the SS-RSRP is above a configured RSRP threshold. In the patterned region at the intersection UE2 has both SSB0 and SSB3 above the threshold.

When a SSB with a SS-RSRP over the threshold is selected, the UE will transmit on the CG resources associated with the selected SSB. As it is possible to configure several CG-SDT configurations for the UE, one option is to configure one, or different sets of SSBs, in in each CG-SDT configuration. Another option is that only one CG-SDT configuration is given to the UE and that this configuration contains all SSBs that the UE can use.

According to existing RAN2 agreements, one SSB with a SS-RSRP above a threshold may be selected, and transmissions done on that (reoccurring) CG resource. Existing agreements do not cover the remaining CG resources associated to other SSBs; one possibility is that they are unused. If no re-evaluation is done of the criteria for SSB selection so that the UE stays on the same CG resource, the unused resources may advantageously be released from the gNB side and assigned to other UEs. Another possibility is that the resources for other SSB associations may be kept and that a re-evaluation is done at some point in time and a new selection is performed, possibly leading to a new selected SSB with corresponding CG-SDT resources.

FIG. 2 shows an example SSB mapping, in which 4 SSBs are one to one mapped to 4 CG PUSCH occasions firstly in increasing order of frequency domain and secondly in increasing order in time domain in each CG period. When SSB0 is selected, only CG PUSCH occasion 0 will be used, other 3 CG PUSCH occasions will not be used for transmission by UE although the network will try to detect potential transmissions on all CG PUSCH occasions.

As shown in FIG. 2, 4 SSBs are one to one mapped to 4 CG PUSCH occasions per CG period.

TS 38.331 v 16.4.1, available at https://portal.3gpp.org/desktopmodules/Specifications/SpecificationDetails.aspx?specificationId=3197 as of 30 Jun. 2021, specifies the Radio Resource Control protocol for the radio interface between UE and NG-RAN.

TS 38.321 v 16.4.0, available at https://portal.3gpp.org/desktopmodules/Specifications/SpecificationDetails.aspx?specificationId=3194 as of 30 Jun. 2021, specifies the NR MAC protocol.

TS 38.304 v 16.4.0, available at https://portal.3gpp.org/desktopmodules/Specifications/SpecificationDetails.aspx?specificationId=3192 as of 30 Jun. 2021, specifies the Access Stratum (AS) part of the UE procedures in RRC_IDLE state (also called Idle mode) and RRC_INACTIVE state.

TS 38.213 v 16.6.0, available at https://portal.3gpp.org/desktopmodules/Specifications/SpecificationDetails.aspx?specificationId=3215 as of 30 Jun. 2021, specifies and establishes the characteristics of the physical layer procedures for control operations in 5G-NR.

There currently exist certain challenge(s). During an ongoing CG-SDT procedure, there is a possibility that all data in the UE buffer cannot fit in the transmission block (TB) transmitted in the selected CG resource with the associated SSB. Where all data in the UE buffer cannot fit in the transmission block, in existing systems the UE has two options. The first option is to wait until the next occasion of the selected CG resource and transmit the remaining data and the second option is to include a BSR in the transmission on the selected CG resource to trigger a dynamic grant from gNB to enable transmission of the remaining data. A problem with both approaches is that they may lead to unnecessary delays; the selected CG resources may be spaced far apart in time and the dynamic grant may not be scheduled immediately due to load or other reasons. As it is possible that there are unused CG resources, it may be possible to provide improvements including reduced delays and more efficient use of resources.

SUMMARY

It is an object of the present disclosure to provide methods, user equipments and network nodes supporting the more efficient use of CG resources in uplink transmissions, thereby facilitating reduced transmission delays.

Certain aspects of the disclosure and their embodiments may provide solutions to these or other challenges. Aspects and/or embodiments may provide for use of more than one CG resource and rules for how this may be accomplished. More than one CG resource may be used, for example, when there is more than one CG resource with SSB association satisfying SS-RSRP above threshold. New rules for triggering BSR are disclosed and methods to indicate that other CG resources will be used to allow gNB to not blind decode the CG resources that where not selected initially.

An embodiment of the disclosure provides a method performed by a by a user equipment for uplink data transmission of uplink data to a network node. The method comprises selecting a transmission resource associated with a SSB. The method further comprises determining whether to select one or more further transmission resources associated with SSBs. The method also comprises transmitting uplink data using the transmission resource and, if selected, the one or more further transmission resources.

A further embodiment of the disclosure provides a method performed by a network node for receiving uplink data transmissions from a UE. The method comprises receiving an uplink data transmission using a SSB associated with a transmission resource. The method also comprises receiving a further uplink data transmission using one or more further SSBs associated with one or more further transmission resources.

Further embodiments provide user equipments, network nodes and communication systems configured to perform the methods as defined herein.

Certain embodiments may provide one or more of the following technical advantage(s). Embodiments may enable use of configured CG resources that are otherwise unused and/or reduce the burden of blind decoding for gNBs. An example is seen in FIG. 3 where a CG configuration is depicted. In this example, the different SSBs have different number of CG resources in every CG configuration. If, for example, the UE selects SSB3 since this is the SSB with highest SS-RSRP and SSB0 is also above the SS-RSRP threshold, then without use of the present disclosure, the UE would transmit on SSB3 only. According to embodiments, the UE could also transmit on SSB0, thereby potentially providing a large increase in available resources for the UE.

BRIEF DESCRIPTION OF DRAWINGS

For better understanding of the present disclosure, and to show how it may be put into effect, reference will now be made, by way of example only, to the accompanying drawings, in which.

DETAILED DESCRIPTION

Some of the embodiments contemplated herein will now be described more fully with reference to the accompanying drawings. Embodiments are provided by way of example to convey the scope of the subject matter to those skilled in the art.

Figure 4:
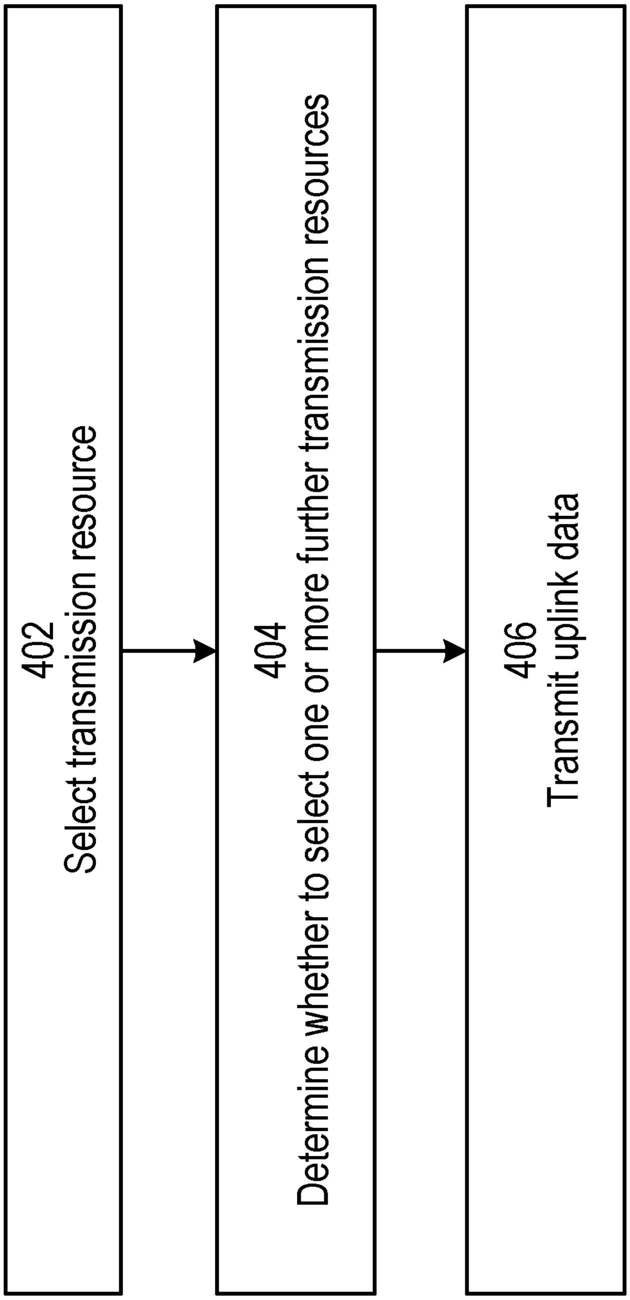
FIG. 4 is a flowchart of a method in accordance with embodiments.

FIG. 4 depicts a method in accordance with particular embodiments. The method 4 may be performed by a UE or wireless device (e.g. the UE 712 or UE 800 as described later with reference to FIGS. 7 and 8 respectively) for uplink data transmission of uplink data to a network node. The method begins at step 402 with the selecting a transmission resource associated with a SSB. The method continues at step 404 with a determination of whether to select one or more further transmission resources associated with SSBs. The method then continues at step 406 with the transmission of uplink data using the transmission resource and, if selected, the one or more further transmission resources.

Figure 5:
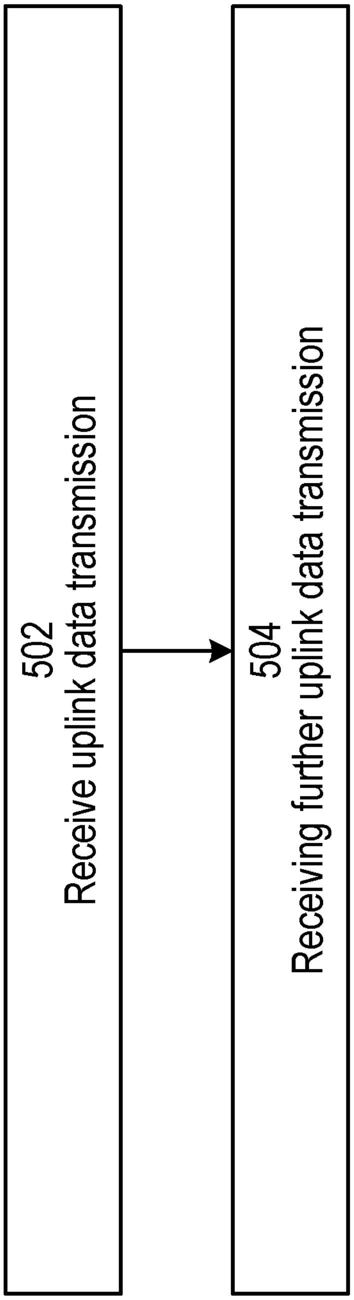
FIG. 5 is a flowchart of a method in accordance with embodiments.

FIG. 5 depicts a method in accordance with particular embodiments. The method 5 may be performed by a network node such as a gNB (e.g. the network node 710 or network node 900 as described later with reference to FIGS. 7 and 9 respectively) for receiving uplink data transmissions from a UE. The method begins at step 502 with the receiving of an uplink data transmission using a SSB associated with a transmission resource. The method continues with step 504 with the receiving of a further uplink data transmission using one or more further SSBs associated with one or more further transmission resources.

In the present disclosure, the term "CG PUSCH resource" (also referred to as "CG resource" or "CG configured PUSCH resource") means the time, frequency and/or DMRS resources configured in a configured grant for PUSCH transmissions.

According to embodiments, the UE may select one CG resource from the set of CG resources associated to SSBs with Synchronization Signal Reference Signal Received Power (SS-RSRP) above a predetermined or configured RSRP threshold. Hence, the selected CG resource has an associated SSB with SS-RSRP above the RSRP threshold. Other CG resources with associated SSBs having SS-RSRP above the RSRP threshold which are not selected, i.e. with associations to other SSBs may be referred to as "allowed CG resources". Quality measures other than SS-RSRP (and corresponding thresholds) may additionally or alternatively be used when selecting the transmission resources, for example, RSRQ above a predetermined or configured RSRQ threshold. If none of the transmission resources have SSBs with quality measures above the threshold, the UE may randomly select a SSB or may switch to non-SDT or may switch to RA-SDT.

Methods on Allowing SDT Transmission on Multiple CG PUSCH Resources

One or more further transmission resources may be selected responsive to a determination that an amount of uplink data for transmission (in the uplink buffer) exceeds the capacity of the SSB associated with the selected transmission resource. If UE has more data configured for, for example, CG-SDT in its UL buffer than can fit in the next selected CG resource transmission opportunity, the UE may then transmit in one or more of the allowed CG resources.

Where all the uplink data can be sent in the allowed CG resources (that is, including the further transmission resources), the UE may not send a Buffer Status Report (BSR). In some embodiments, a time period that is a maximum allowed time interval may be configured for time between the selected CG resource and the last allowed CG resource used to empty the UE buffer; if the UE buffer can be emptied in this time period a BSR may be avoided.

Alternatively, where the allowed CG resources do not allow the UE buffer to be emptied in the time period, a BSR may be sent.

In some embodiments, the allowed CG resources may be used even where this will not empty the UE buffer. Where a BSR is sent, the BSR may be sent in: the selected CG resource; and/or any selected or allowed CG resource before the configured time period expires; and/or the last selected or allowed CG resource before the configured time period expires; and/or the first selected or allowed CG resource before the configured time period expires. The BSR may include information useful to the receiving network node, for example, may indicate the amount of data remaining in the UE buffer when the BSR is sent.

In some embodiments, including those discussed above, the time period (maximum allowed time interval) may be a number of CG periods (for example, an integer number of CG periods, where the integer number may be one).

In some embodiments, conditions for allowing transmission on multiple CG SDT resources in one time period (which may be an integer number of CG periods, including one period) may comprise one or more of the following:

- Multiple CG PUSCH resources in one period mapped to one or multiple SSBs with SS-RSRP above the RSRP threshold;
- Timing Advance (TA) is valid before the transmission on the multiple CG PUSCH resources;
- The UL buffer data volume is larger than can be transmitted in one CG resource
- Whether multiple CG PUSCH configurations are configured;
- Whether multiple SSBs are configured for one CG PUSCH configuration; and/or
- If the priority of the data is above a predefined or configured priority threshold, e.g. LCH priority of the logical channel is above a threshold.

Methods on Indicating Additional SDT Transmission on Multiple CG PUSCH Resources In some embodiments, to assist network nodes such as gNBs in receiving additional SDT on remaining allowed CG resources in one CG period, UEs may indicate the latter SDT transmissions in CG PUSCH in earlier SDT transmissions. Including indications may save blind decoding effort required for gNB on all CG PUSCH occasions in all CG periods and in all CG configurations.

In some embodiments, an indication may be sent (for example) in a CG PUSCH on a first selected CG resource. In embodiments where an indication is sent, the indication may include one or more of the following:

- which one or more CG resources will be used for (subsequent) small data transmissions;
- which one or multiple SSBs will be selected for subsequent small data transmissions;
- which one or multiple CG period after this CG period will have subsequent small data transmissions;
- which one or multiple CG configurations will have subsequent small data transmissions;
- which CG PUSCH occasions/SSBs/CG periods/CG configurations will not have SDT (for example: a bitmap with N bits can be used to indicate which CG period(s) among a consecutive N CG periods will have or not have SDT);
- That some CG resource in addition to the selected resource will or may be used for additional transmissions; and/or
- which SSBs fulfil a predetermined or configured threshold.

In some embodiments, the indication may be sent in a Medium Access Control-Control Element, MAC CE. The MAC CE may indicate which selected and allowed CG resources may be used by the UE, and may be sent from the UE to a gNB.

In some embodiments, the SSB associated with the transmission resources and one or more SSBs associated with the further transmission resources may be selected from a set of SSBs preconfigured to support the uplink data transmissions. Additionally or alternatively, a subset of CG PUSCH occasions may be pre-configured to support multiple SDT transmissions in one CG period.

In accordance with some of the above embodiments, the UE may determine the use of allowed CG resources following a network configuration which indicates e.g., a single, a set or subset of multiple associated CG resource-SSB sets that can be used for subsequent transmissions.

Figure 1:
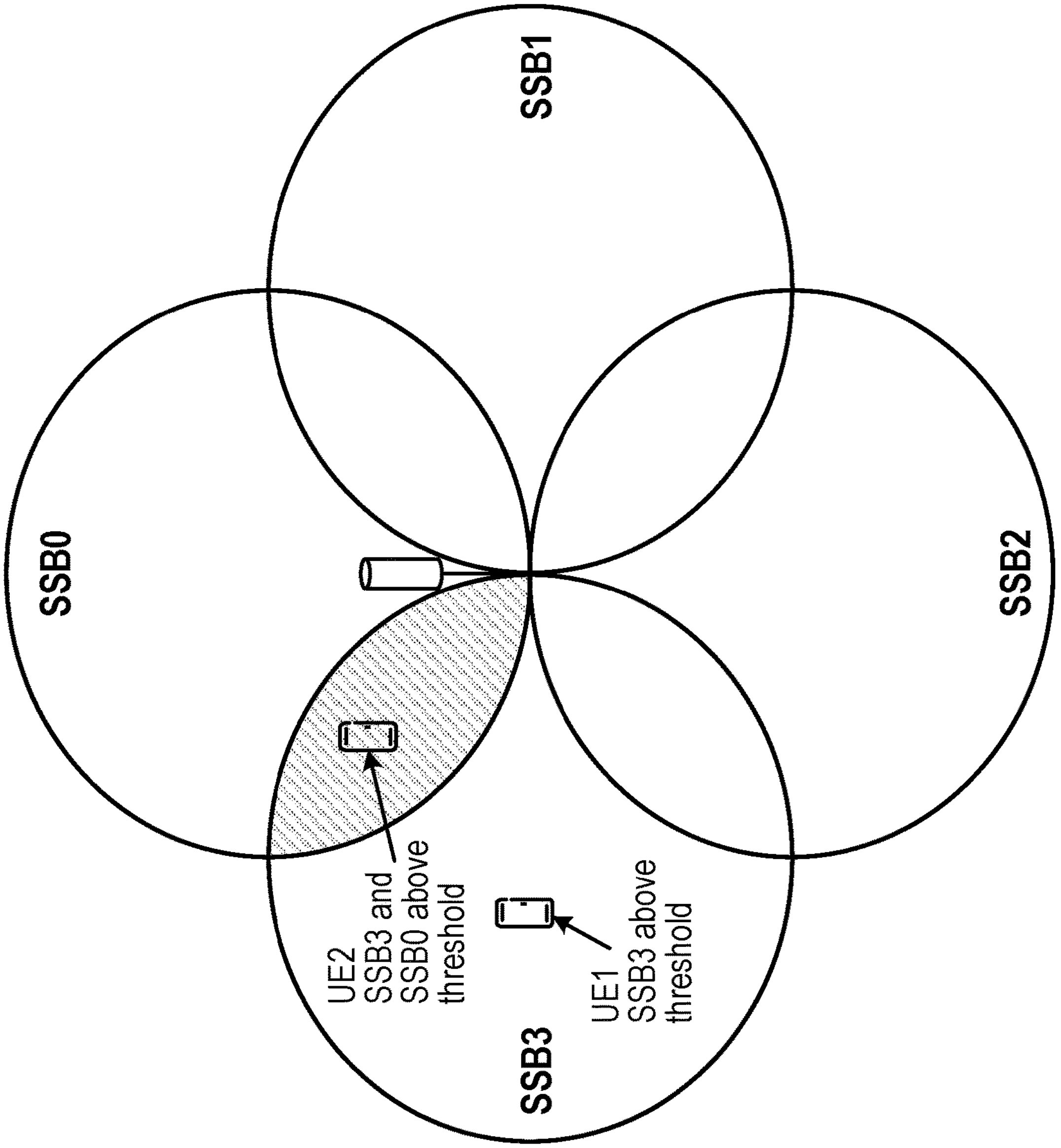
FIG. 1 is a diagram of a UE having one or more SSBs that satisfy a SS-RSRP threshold criterion.
Figure 2:
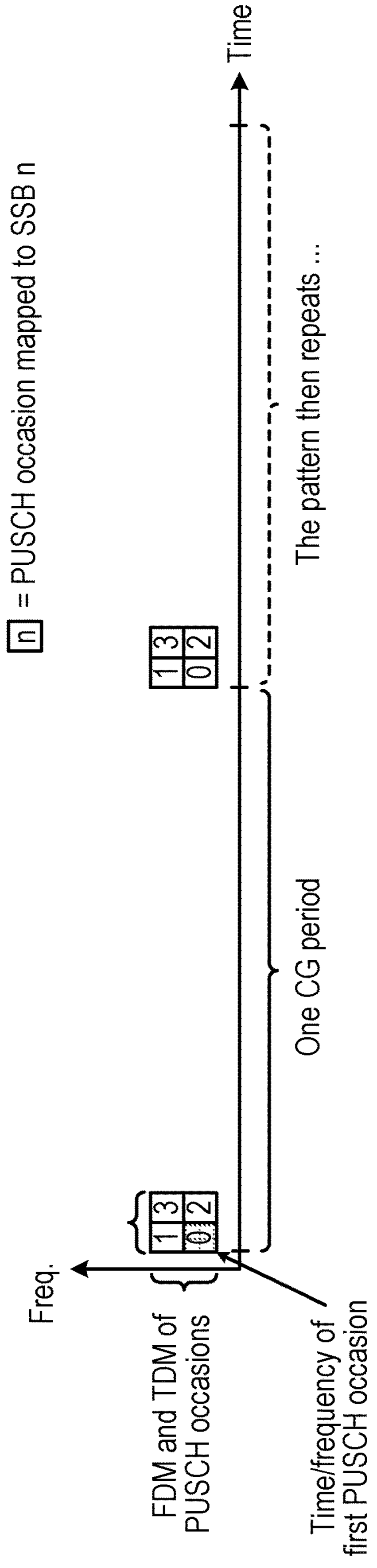
FIG. 2 is a diagram illustrating the mapping of 4 SSBs to 4 CG PUSCH occasions per CG period, using 1:1 mapping.
Figure 3:
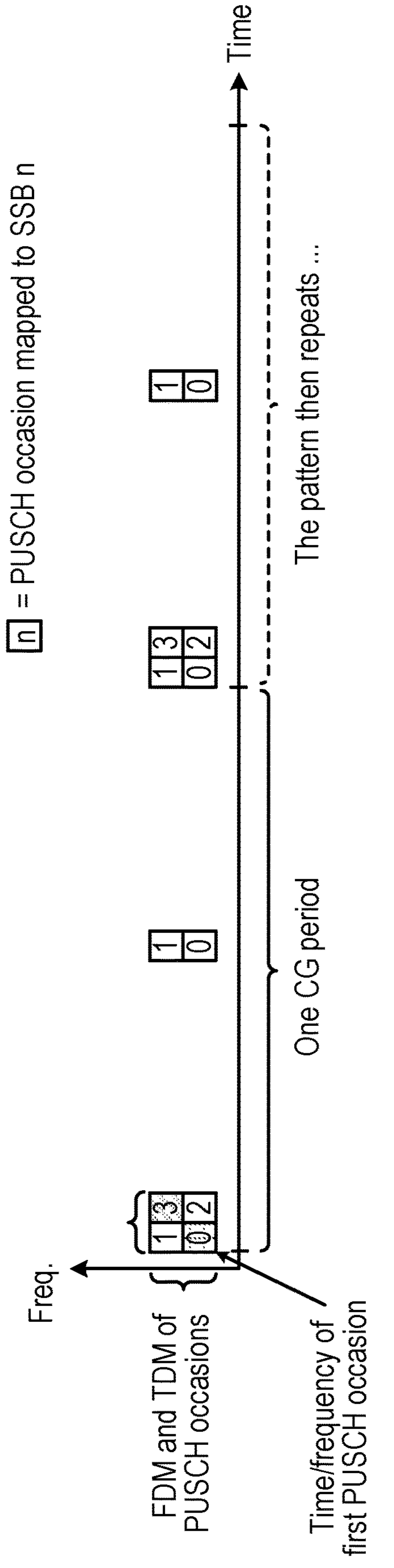
FIG. 3 is a diagram of a CG configuration in accordance with embodiments.
Figure 6:
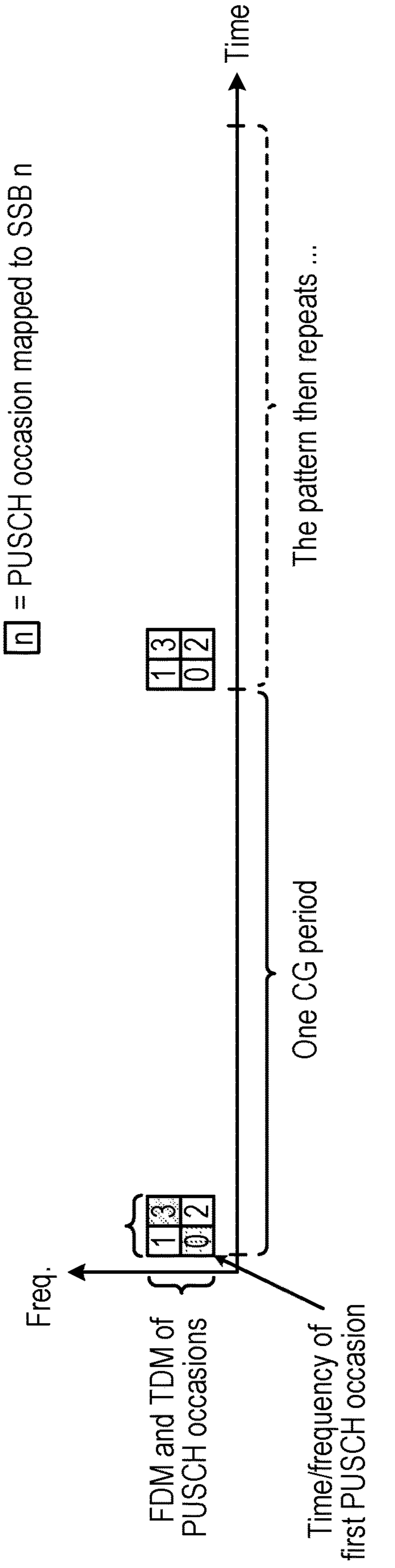
FIG. 6 is a diagram of a situation in which 4 SSBs are one to one mapped to 4 CG PUSCH occasions per CG period.

As an example, and with reference to FIG. 2, 4 SSBs may be one to one mapped to 4 CG PUSCH occasions configured in each CG period. An initial small data transmission on CG resource 0 from a UE is received by the gNB and if a CG PUSCH occasion 3 is indicated in the CG PUSCH on the CG occasion 0 for subsequent SDT from this UE, the gNB will try to decode the further small data on a resource 3 which is assumed as an allowed CG resource. This is illustrated in FIG. 6 which shows a situation in which 4 SSBs are one to one mapped to 4 CG PUSCH occasions per CG period.

Figure 7:
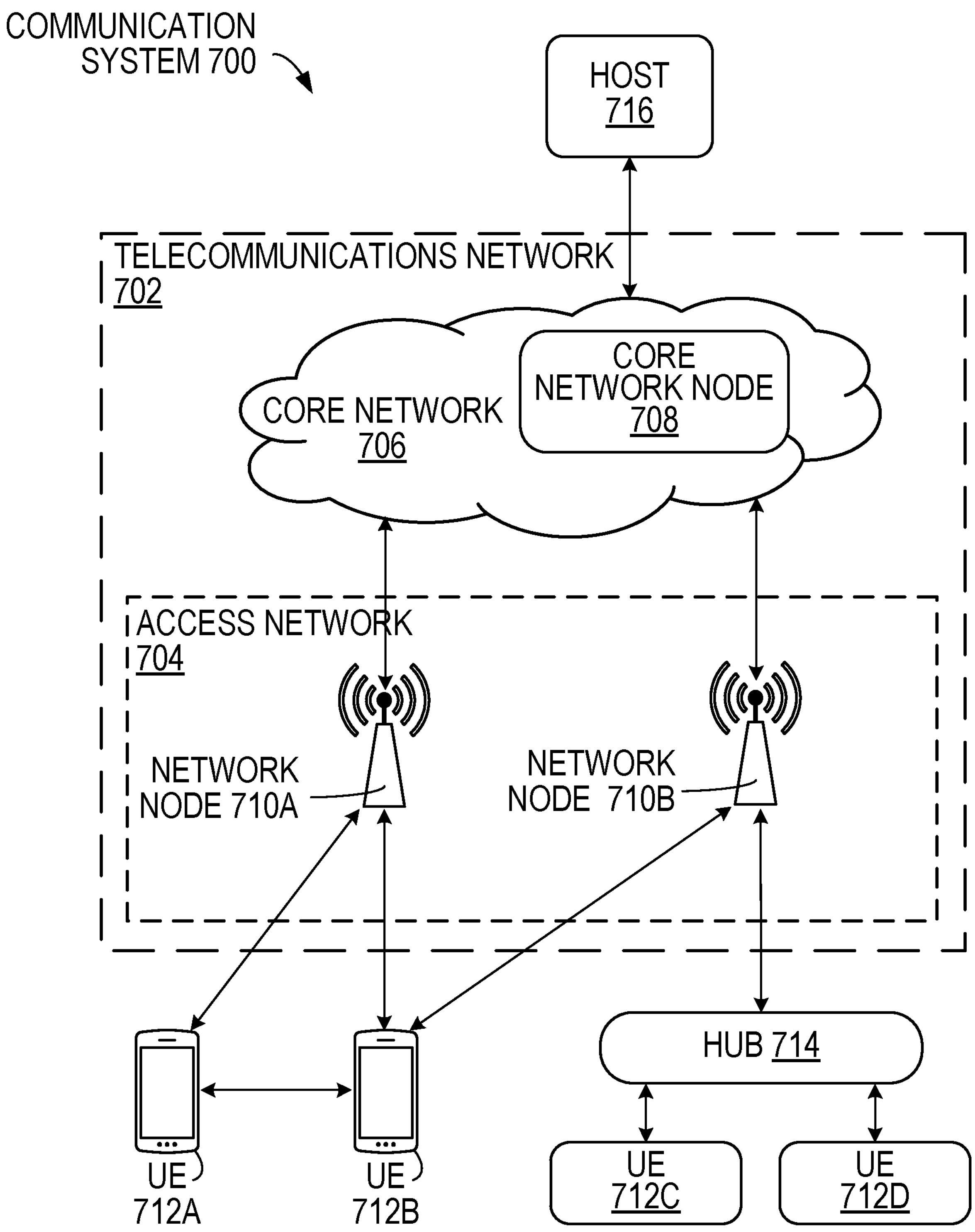
FIG. 7 is a diagram of a communication system in accordance with embodiments.

FIG. 7 shows an example of a communication system 700 in accordance with some embodiments.

In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710*a* and 710*b* (one or more of which may be generally referred to as network nodes 710), or any other similar 3rd Generation Partnership Project (3GPP) access node or non-3GPP access point. The network nodes 710 facilitate direct or indirect connection of user equipment (UE), such as by connecting UEs 712*a*, 712*b*, 712*c*, and 712*d* (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunications network 702 may support network slicing to provide different logical networks to different devices that are connected to the telecommunication network 702. For example, the telecommunications network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 7, the hub 714 communicates with the access network 704 to facilitate indirect communication between one or more UEs (e.g., UE 712*c* and/or 712*d*) and network nodes (e.g., network node 710*b*). In some examples, the hub 714 may be a controller, router, a content source and analytics node, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a VR headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular in if one or more of the UEs are low energy IoT devices.

The hub 714 may have a constant/persistent or intermittent connection to the network node 710*b*. The hub 714 may also allow for a different communication scheme and/or schedule between the hub 714 and UEs (e.g., UE 712*c* and/or 712*d*), and between the hub 714 and the core network 706. In other examples, the hub 714 is connected to the core network 706 and/or one or more UEs via a wired connection. Moreover, the hub 714 may be configured to connect to an M2M service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710*b*. In other embodiments, the hub 714 may be a non-dedicated hub—that is, a device which is capable of operating to route communications between the UEs and network node 710*b*, but which is additionally capable of operating as a communication start and/or end point for certain data channels.

Figure 8:
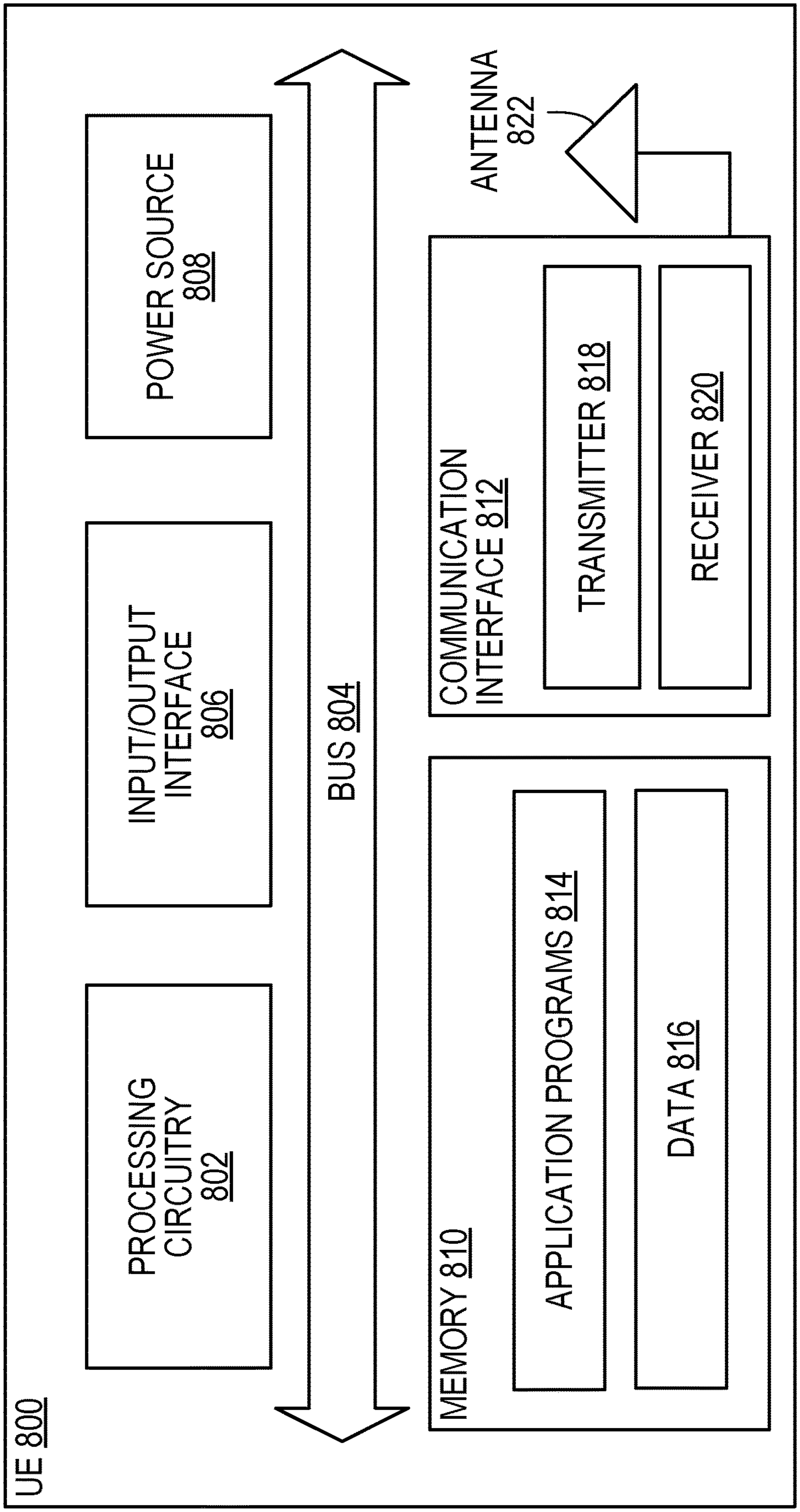
FIG. 8 is a diagram of a UE in accordance with embodiments.

FIG. 8 shows a UE 800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 802 is configured to process instructions and data and may be configured to implement any sequential state machine operative to execute instructions stored as machine-readable computer programs in the memory 810. The processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 802 may include multiple central processing units (CPUs). The processing circuitry 802 may be operable to provide, either alone or in conjunction with other UE 800 components, such as the memory 810, to provide UE 800 functionality. For example, the processing circuitry 802 may be configured to cause the UE 802 to perform the methods as described with reference to FIG. 4.

In the example, the input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 808 is structured as a battery or battery pack. Other types of power sources, such as an external power source (e.g., an electricity outlet), photovoltaic device, or power cell, may be used. The power source 808 may further include power circuitry for delivering power from the power source 808 itself, and/or an external power source, to the various parts of the UE 800 via input circuitry or an interface such as an electrical power cable. Delivering power may be, for example, for charging of the power source 808. Power circuitry may perform any formatting, converting, or other modification to the power from the power source 808 to make the power suitable for the respective components of the UE 800 to which power is supplied.

The memory 810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 810 includes one or more application programs 814, such as an operating system, web browser application, a widget, gadget engine, or other application, and corresponding data 816. The memory 810 may store, for use by the UE 800, any of a variety of various operating systems or combinations of operating systems.

The memory 810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 810 may allow the UE 800 to access instructions, application programs and the like, stored on transitory or non-transitory memory media, to off-load data, or to upload data. An article of manufacture, such as one utilizing a communication system may be tangibly embodied as or in the memory 810, which may be or comprise a device-readable storage medium.

The processing circuitry 802 may be configured to communicate with an access network or other network using the communication interface 812. The communication interface 812 may comprise one or more communication subsystems and may include or be communicatively coupled to an antenna 822. The communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, the transmitter 818 and receiver 820 may be coupled to one or more antennas (e.g., antenna 822) and may share circuit components, software or firmware, or alternatively be implemented separately.

In some embodiments, communication functions of the communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
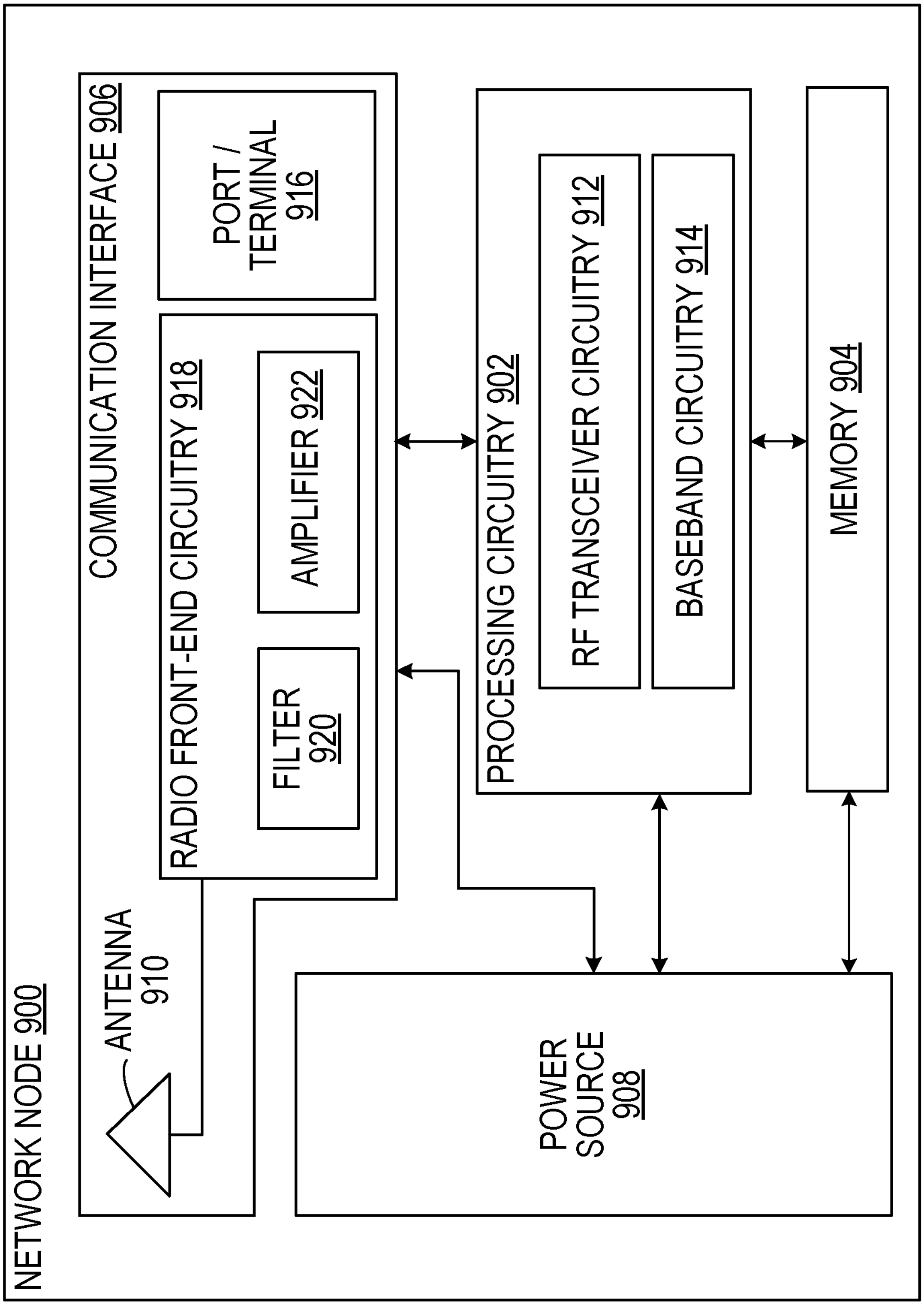
FIG. 9 is a diagram of a network node in accordance with embodiments.

FIG. 9 shows a network node 900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 900 includes processing circuitry 902, a memory 904, a communication interface 906, and a power source 908, and/or any other component, or any combination thereof. The network node 900 may be composed of multiple physically separate components (e.g., a NodeB component and a RNC component, or a BTS component and a BSC component, etc.), which may each have their own respective components. In certain scenarios in which the network node 900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 900 may be configured to support multiple radio access technologies (RATs). In such embodiments, some components may be duplicated (e.g., separate memory 904 for different RATs) and some components may be reused (e.g., a same antenna 910 may be shared by different RATs). The network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

The processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as the memory 904, to provide network node 900 functionality. For example, the processing circuitry 902 may be configured to cause the network node to perform the methods as described with reference to FIG. 5.

In some embodiments, the processing circuitry 902 includes a system on a chip (SOC). In some embodiments, the processing circuitry 902 includes one or more of radio frequency (RF) transceiver circuitry 912 and baseband processing circuitry 914. In some embodiments, the radio frequency (RF) transceiver circuitry 912 and the baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

The memory 904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 902. The memory 904 may store any suitable instructions, data, or information, including a computer program, software, an application including one or more of logic, rules, code, tables, and/or other instructions capable of being executed by the processing circuitry 902 and utilized by the network node 900. The memory 904 may be used to store any calculations made by the processing circuitry 902 and/or any data received via the communication interface 906. In some embodiments, the processing circuitry 902 and memory 904 is integrated.

The communication interface 906 is used in wired or wireless communication of signaling and/or data between a network node, access network, and/or UE. As illustrated, the communication interface 906 comprises port(s)/terminal(s) 916 to send and receive data, for example to and from a network over a wired connection. The communication interface 906 also includes radio front-end circuitry 918 that may be coupled to, or in certain embodiments a part of, the antenna 910. Radio front-end circuitry 918 comprises filters 920 and amplifiers 922. The radio front-end circuitry 918 may be connected to an antenna 910 and processing circuitry 902. The radio front-end circuitry may be configured to condition signals communicated between antenna 910 and processing circuitry 902. The radio front-end circuitry 918 may receive digital data that is to be sent out to other network nodes or UEs via a wireless connection. The radio front-end circuitry 918 may convert the digital data into a radio signal having the appropriate channel and bandwidth parameters using a combination of filters 920 and/or amplifiers 922. The radio signal may then be transmitted via the antenna 910. Similarly, when receiving data, the antenna 910 may collect radio signals which are then converted into digital data by the radio front-end circuitry 918. The digital data may be passed to the processing circuitry 902. In other embodiments, the communication interface may comprise different components and/or different combinations of components.

In certain alternative embodiments, the network node 900 does not include separate radio front-end circuitry 918, instead, the processing circuitry 902 includes radio front-end circuitry and is connected to the antenna 910. Similarly, in some embodiments, all or some of the RF transceiver circuitry 912 is part of the communication interface 906. In still other embodiments, the communication interface 906 includes one or more ports or terminals 916, the radio front-end circuitry 918, and the RF transceiver circuitry 912, as part of a radio unit (not shown), and the communication interface 906 communicates with the baseband processing circuitry 914, which is part of a digital unit (not shown).

The antenna 910 may include one or more antennas, or antenna arrays, configured to send and/or receive wireless signals. The antenna 910 may be coupled to the radio front-end circuitry 918 and may be any type of antenna capable of transmitting and receiving data and/or signals wirelessly. In certain embodiments, the antenna 910 is separate from the network node 900 and connectable to the network node 900 through an interface or port.

The antenna 910, communication interface 906, and/or the processing circuitry 902 may be configured to perform any receiving operations and/or certain obtaining operations described herein as being performed by the network node. Any information, data and/or signals may be received from a UE, another network node and/or any other network equipment. Similarly, the antenna 910, the communication interface 906, and/or the processing circuitry 902 may be configured to perform any transmitting operations described herein as being performed by the network node. Any information, data and/or signals may be transmitted to a UE, another network node and/or any other network equipment.

The power source 908 provides power to the various components of network node 900 in a form suitable for the respective components (e.g., at a voltage and current level needed for each respective component). The power source 908 may further comprise, or be coupled to, power management circuitry to supply the components of the network node 900 with power for performing the functionality described herein. For example, the network node 900 may be connectable to an external power source (e.g., the power grid, an electricity outlet) via an input circuitry or interface such as an electrical cable, whereby the external power source supplies power to power circuitry of the power source 908. As a further example, the power source 908 may comprise a source of power in the form of a battery or battery pack which is connected to, or integrated in, power circuitry. The battery may provide backup power should the external power source fail.

Embodiments of the network node 900 may include additional components beyond those shown in FIG. 9 for providing certain aspects of the network node's functionality, including any of the functionality described herein and/or any functionality necessary to support the subject matter described herein. For example, the network node 900 may include user interface equipment to allow input of information into the network node 900 and to allow output of information from the network node 900. This may allow a user to perform diagnostic, maintenance, repair, and other administrative functions for the network node 900.

Figure 10:
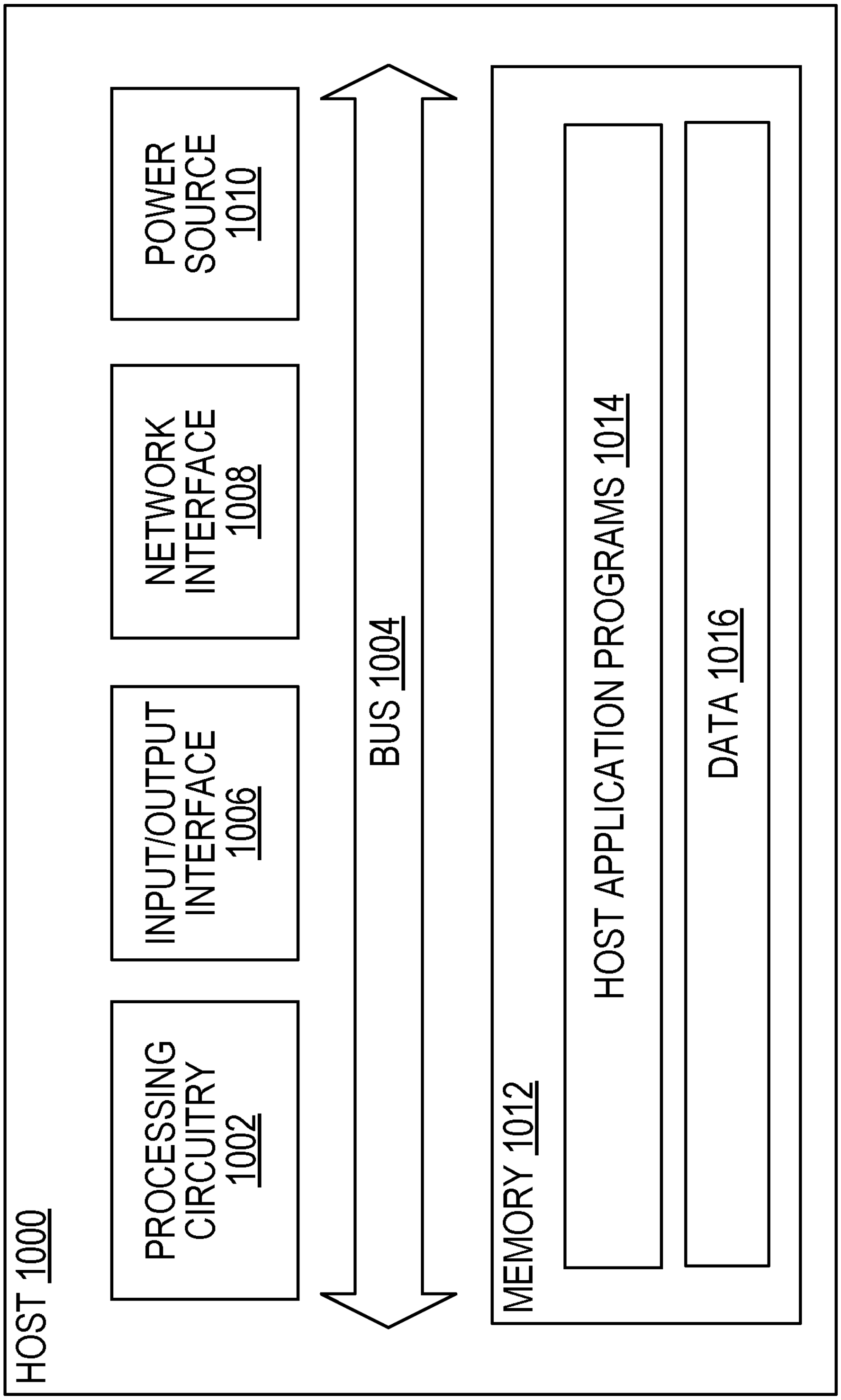
FIG. 10 is a block diagram of a host in accordance with embodiments.

FIG. 10 is a block diagram of a host 1000, which may be an embodiment of the host 716 of FIG. 7, in accordance with various aspects described herein. As used herein, the host 1000 may be or comprise various combinations hardware and/or software, including a standalone server, a blade server, a cloud-implemented server, a distributed server, a virtual machine, container, or processing resources in a server farm. The host 1000 may provide one or more services to one or more UEs.

The host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8 and 9, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of the host 1000 may utilize only a subset or all of the components shown. The host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of a core network. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
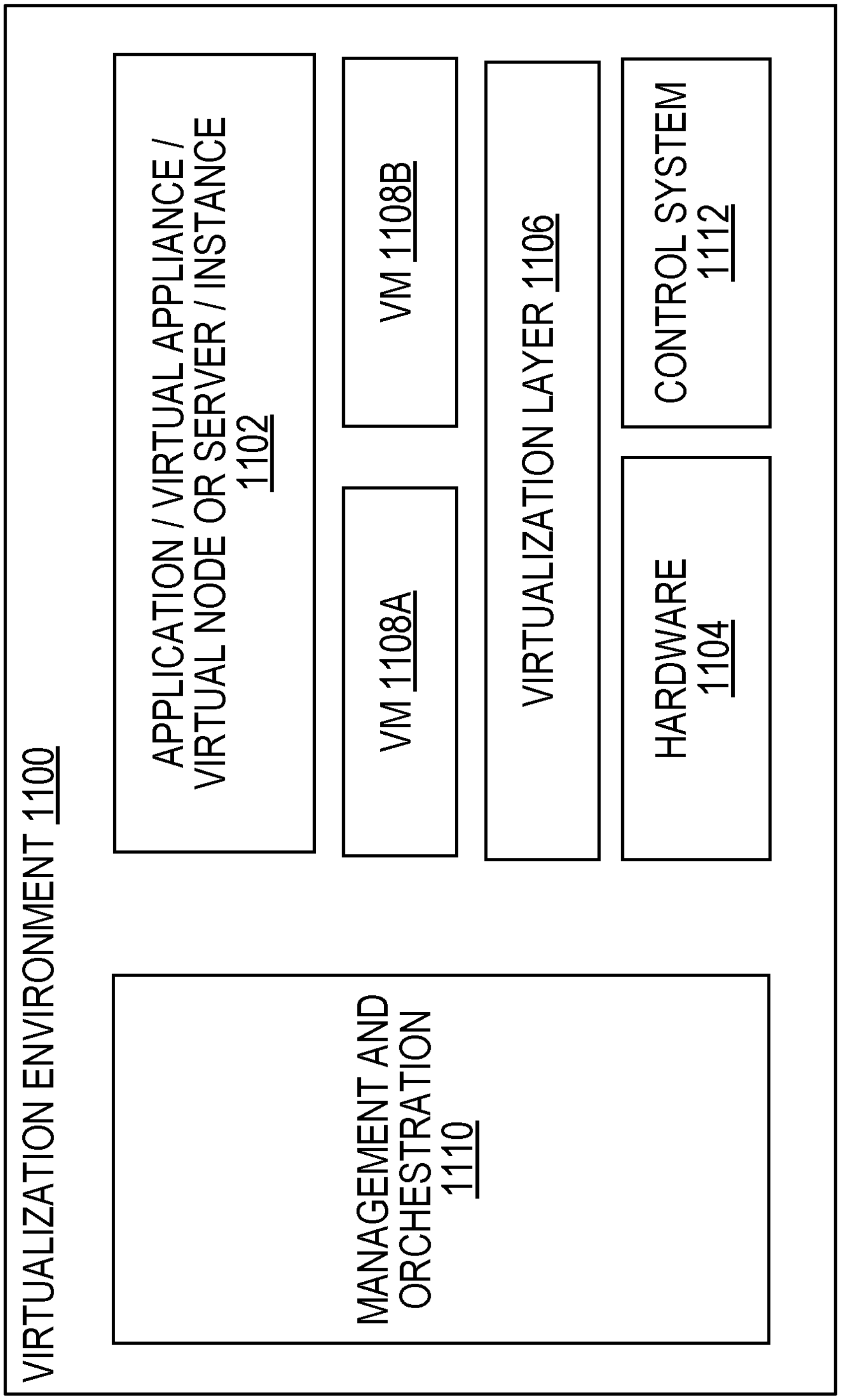
FIG. 11 is a block diagram of a virtualization environment in accordance with embodiments.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1102 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs 1108*a* and 1108*b* (one or more of which may be generally referred to as VMs 1108), and/or perform any of the functions, features and/or benefits described in relation with some embodiments described herein. The virtualization layer 1106 may present a virtual operating platform that appears like networking hardware to the VMs 1108.

The VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1108 may be a software implementation of a physical machine that runs programs as if they were executing on a physical, non-virtualized machine. Each of the VMs 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of the hardware 1104 and corresponds to the application 1102.

Hardware 1104 may be implemented in a standalone network node with generic or specific components. Hardware 1104 may implement some functions via virtualization. Alternatively, hardware 1104 may be part of a larger cluster of hardware (e.g. such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

Figure 12:
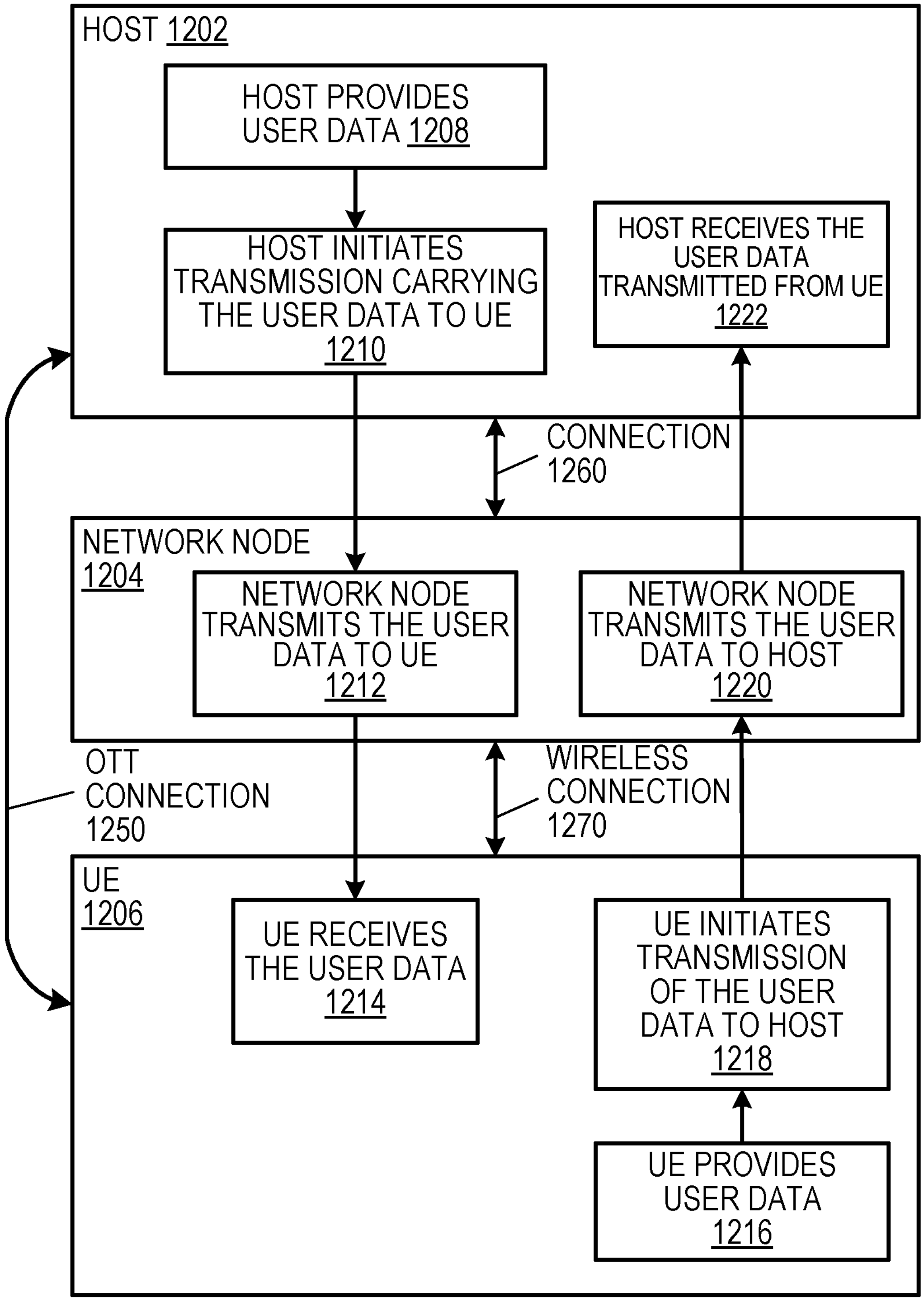
FIG. 12 is a communication diagram of a system in accordance with embodiments.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712*a* of FIG. 7 and/or UE 800 of FIG. 8), network node (such as network node 710*a* of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. The host 1202 also includes software, which is stored in or accessible by the host 1202 and executable by the processing circuitry. The software includes a host application that may be operable to provide a service to a remote user, such as the UE 1206 connecting via an over-the-top (OTT) connection 1250 extending between the UE 1206 and host 1202. In providing the service to the remote user, a host application may provide user data which is transmitted using the OTT connection 1250.

The network node 1204 includes hardware enabling it to communicate with the host 1202 and UE 1206. The connection 1260 may be direct or pass through a core network (like core network 706 of FIG. 7) and/or one or more other intermediate networks, such as one or more public, private, or hosted networks. For example, an intermediate network may be a backbone network or the Internet.

The UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of the host 1202. In the host 1202, an executing host application may communicate with the executing client application via the OTT connection 1250 terminating at the UE 1206 and host 1202. In providing the service to the user, the UE's client application may receive request data from the host's host application and provide user data in response to the request data. The OTT connection 1250 may transfer both the request data and the user data. The UE's client application may interact with the user to generate the user data that it provides to the host application through the OTT connection 1250.

The OTT connection 1250 may extend via a connection 1260 between the host 1202 and the network node 1204 and via a wireless connection 1270 between the network node 1204 and the UE 1206 to provide the connection between the host 1202 and the UE 1206. The connection 1260 and wireless connection 1270, over which the OTT connection 1250 may be provided, have been drawn abstractly to illustrate the communication between the host 1202 and the UE 1206 via the network node 1204, without explicit reference to any intermediary devices and the precise routing of messages via these devices.

As an example of transmitting data via the OTT connection 1250, in step 1208, the host 1202 provides user data, which may be performed by executing a host application. In some embodiments, the user data is associated with a particular human user interacting with the UE 1206. In other embodiments, the user data is associated with a UE 1206 that shares data with the host 1202 without explicit human interaction. In step 1210, the host 1202 initiates a transmission carrying the user data towards the UE 1206. The host 1202 may initiate the transmission responsive to a request transmitted by the UE 1206. The request may be caused by human interaction with the UE 1206 or by operation of the client application executing on the UE 1206. The transmission may pass via the network node 1204, in accordance with the teachings of the embodiments described throughout this disclosure. Accordingly, in step 1212, the network node 1204 transmits to the UE 1206 the user data that was carried in the transmission that the host 1202 initiated, in accordance with the teachings of the embodiments described throughout this disclosure. In step 1214, the UE 1206 receives the user data carried in the transmission, which may be performed by a client application executed on the UE 1206 associated with the host application executed by the host 1202.

In some examples, the UE 1206 executes a client application which provides user data to the host 1202. The user data may be provided in reaction or response to the data received from the host 1202. Accordingly, in step 1216, the UE 1206 may provide user data, which may be performed by executing the client application. In providing the user data, the client application may further consider user input received from the user via an input/output interface of the UE 1206. Regardless of the specific manner in which the user data was provided, the UE 1206 initiates, in step 1218, transmission of the user data towards the host 1202 via the network node 1204. In step 1220, in accordance with the teachings of the embodiments described throughout this disclosure, the network node 1204 receives user data from the UE 1206 and initiates transmission of the received user data towards the host 1202. In step 1222, the host 1202 receives the user data carried in the transmission initiated by the UE 1206.

One or more of the various embodiments improve the performance of OTT services provided to the UE 1206 using the OTT connection 1250, in which the wireless connection 1270 forms the last segment. More precisely, the teachings of these embodiments may improve the use of transmission resources (such as CG resources) by enabling resources that may otherwise have not been used to be used, and may also reduce the burden on network nodes (such as gNBs) due to blind decoding. Accordingly, benefits such as reduced latency and improved efficiency may be provided.

In an example scenario, factory status information may be collected and analyzed by the host 1202. As another example, the host 1202 may process audio and video data which may have been retrieved from a UE for use in creating maps. As another example, the host 1202 may collect and analyze real-time data to assist in controlling vehicle congestion (e.g., controlling traffic lights). As another example, the host 1202 may store surveillance video uploaded by a UE. As another example, the host 1202 may store or control access to media content such as video, audio, VR or AR which it can broadcast, multicast or unicast to UEs. As other examples, the host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1250 between the host 1202 and UE 1206, in response to variations in the measurement results. The measurement procedure and/or the network functionality for reconfiguring the OTT connection may be implemented in software and hardware of the host 1202 and/or UE 1206. In some embodiments, sensors (not shown) may be deployed in or in association with other devices through which the OTT connection 1250 passes; the sensors may participate in the measurement procedure by supplying values of the monitored quantities exemplified above, or supplying values of other physical quantities from which software may compute or estimate the monitored quantities. The reconfiguring of the OTT connection 1250 may include message format, retransmission settings, preferred routing etc.; the reconfiguring need not directly alter the operation of the network node 1204. Such procedures and functionalities may be known and practiced in the art. In certain embodiments, measurements may involve proprietary UE signaling that facilitates measurements of throughput, propagation times, latency and the like, by the host 1202. The measurements may be implemented in that software causes messages to be transmitted, in particular empty or 'dummy' messages, using the OTT connection 1250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP $3^{rd}$ Generation Partnership Project
5G $5^{th}$ Generation
5GC 5G Core
5GS 5G System
CN Core Network
eNB Evolved Node B (A radio base station in LTE.)
gNB 5G Node B (A radio base station in NR.)
NG The interface/reference point between the RAN and the CN in 5G/NR.
NG-C The control plane part of NG (between a gNB and an AMF).
NG-RAN Next Generation Radio Access Network
NG-U The user plane part of NG (between a gNB and a UPF).
NR New Radio
nUE NR UE
RAN Radio Access Network
RedCap Reduced Capacity
RRC Radio Resource Control
rUE RedCap UE
TS Technical Specification
UE User Equipment
1×RTT CDMA2000 1× Radio Transmission Technology
6G 6th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAT Radio Access Technology
RLC Radio Link Control
RLM Radio Link Management
RNC Radio Network Controller
RNTI Radio Network Temporary Identifier
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UL Uplink
USIM Universal Subscriber Identity Module
UTDOA Uplink Time Difference of Arrival
WCDMA Wide CDMA
WLAN Wide Local Area Network The following numbered statements provide additional information on the disclosure:

1. A method performed by a user equipment for uplink data transmission of uplink data to a network node, the method comprising:
selecting a transmission resource associated with a Synchronization Signal Block, SSB,
determining whether to select one or more further transmission resources associated with SSBs; and
transmitting uplink data using the transmission resource and, if selected, the one or more further transmission resources.
2. The method of statement 1, wherein the one or more further transmission resources are selected responsive to a determination that an amount of uplink data for transmission exceeds the capacity of the SSB associated with the selected transmission resource.
3. The method of any preceding statement wherein the user equipment is in a Radio Resource Control, RRC, inactive state.
4. The method of any preceding statement, wherein the uplink data transmission is a Configured Grant based Small Data Transmission, CG-SDT, and wherein the transmission resource and one or more further transmission resources are CG resources.
5. The method of any preceding statement, wherein the method further comprises the step of, prior to the step of selecting a transmission resource, preconfiguring the user equipment with Physical Uplink Shared Channel, PUSCH, resources for uplink data transmission.
6. The method of any preceding statement, wherein the SSBs associated with the transmission resource and/or one or more further transmission resources have a quality above a predetermined threshold, optionally wherein the quality is a Synchronization Signal Reference Signal Received Power, SS-RSRP, and the predetermined threshold is a configured RSRP threshold.

7. The method of any preceding statement, wherein a maximum allowed time interval between the selected transmission resource and the latest of the one or more further transmission resources is defined, optionally wherein the maximum allowed time interval is a number of Configured Grant, CG, periods.

8. The method of statement 7, wherein the uplink data is transmitted within the maximum allowed time interval.

9. The method of statement 7 further comprising sending, to the network node, a Buffer Status Report, BSR, containing information on an amount of uplink data for transmission.

10. The method of statement 10, wherein the BSR is sent:

in the SSB associated with the transmission resource; and/or in the first of the one or more SSBs associated with the further transmission resources to be sent; and/or in the last of the one or more SSBs associated with the further transmission resources to be sent within the maximum allowed time interval; and/or in any of the one or more SSBs associated with the further transmission resources other than the first SSB associated with the further transmission resources to be sent or the last SSB associated with the further transmission resources to be sent within the maximum allowed time interval.

11. The method of any of statements 7 to 10, wherein conditions for allowing transmission of uplink data using the SSB associated with the transmission resource and one or more SSBs associated with the further transmission resources within the maximum allowed time interval comprise one or more of:

a Timing Advance, TA, is valid before the transmission on the first of the SSB associated with the transmission resource and one or more SSBs associated with the further transmission resources to be transmitted; and/or the amount of uplink data to be transmitted is larger than the capacity of the SSB associated with the transmission resource; and/or the priority of the uplink data is above a predefined priority threshold.

12. The method of any of the previous statements further comprising indicating, to the network node, information relating to the further transmission resources to be used for transmitting uplink data.

13. The method of statement 12, wherein the indication comprises one or more of: identifiers of the further transmission resources and/or associated SSBs to be used for transmitting the uplink data; and/or identifiers of future time periods to be used for uplink data transmissions; and/or information on CG configurations that will have subsequent uplink data transmissions; and/or information on further transmission resources and/or associated SSBs that will not have subsequent uplink data transmissions;

information on which SSB associated with the transmission resources have a quality above the predetermined threshold.

14. The method of any of statements 12 and 13, wherein the indication is sent in a Medium Access Control-Control Element, MAC-CE.

15. The method of any preceding statement, wherein the SSB associated with the transmission resources and one or more SSBs associated with the further transmission resources are selected from a set of SSBs preconfigured to support the uplink data transmissions.

16. The method of any preceding statement further comprising:

providing user data; and forwarding the user data to a host via the transmission to the network node.

Group B Statements

17. A method performed by a network node for receiving uplink data transmissions from a user equipment, UE, the method comprising:

receiving an uplink data transmission using a SSB associated with a transmission resource; and receiving a further uplink data transmission using one or more further SSBs associated with one or more further transmission resources.

18. The method of statement 17, further comprising receiving a buffer status report, BSR, from the user equipment.

19. The method of any of statements 17 and 18, further comprising receiving an indication of information relating to further transmission resources to be used for transmitting uplink data, from the user equipment.

20. The method of any of the previous statements, further comprising:

obtaining user data; and forwarding the user data to a host or a user equipment.

Group C Statements

21. A user equipment for uplink data transmission to a network node, comprising:

processing circuitry configured to cause the user equipment to perform any of the steps of any of the Group A statements; and power supply circuitry configured to supply power to the processing circuitry.

22. A network node for receiving uplink data transmissions from a user equipment, the network node comprising:

processing circuitry configured to cause the network node to perform any of the steps of any of the Group B statements;

power supply circuitry configured to supply power to the processing circuitry.

23. A user equipment (UE) for uplink data transmission to a network node, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A statements;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

24. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A statements to receive the user data from the host.

25. The host of the previous statement, wherein the cellular network further includes a network node configured to communicate with the UE to transmit the user data to the UE from the host.

26. The host of the previous 2 statements, wherein:

the processing circuitry of the host is configured to execute a host application, thereby providing the user data; and the host application is configured to interact with a client application executing on the UE, the client application being associated with the host application.

27. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of the Group A statements to receive the user data from the host.

28. The method of the previous statement, further comprising:

at the host, executing a host application associated with a client application executing on the UE to receive the user data from the UE.

29. The method of the previous statement, further comprising:

at the host, transmitting input data to the client application executing on the UE, the input data being provided by executing the host application, wherein the user data is provided by the client application in response to the input data from the host application.

30. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A statements to transmit the user data to the host.

31. The host of the previous statement, wherein the cellular network further includes a network node configured to communicate with the UE to transmit the user data from the UE to the host.

32. The host of the previous 2 statements, wherein:

the processing circuitry of the host is configured to execute a host application, thereby providing the user data; and the host application is configured to interact with a client application executing on the UE, the client application being associated with the host application.

33. A method implemented by a host configured to operate in a communication system that further includes a network node and a user equipment (UE), the method comprising:

at the host, receiving user data transmitted to the host via the network node by the UE, wherein the UE performs any of the steps of any of the Group A statements to transmit the user data to the host.

34. The method of the previous statement, further comprising:

at the host, executing a host application associated with a client application executing on the UE to receive the user data from the UE.

35. The method of the previous statement, further comprising:

at the host, transmitting input data to the client application executing on the UE, the input data being provided by executing the host application, wherein the user data is provided by the client application in response to the input data from the host application.

36. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B statements to transmit the user data from the host to the UE.

37. The host of the previous statement, wherein:

the processing circuitry of the host is configured to execute a host application that provides the user data; and the UE comprises processing circuitry configured to execute a client application associated with the host application to receive the transmission of user data from the host.

38. A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B statements to transmit the user data from the host to the UE.

39. The method of the previous statement, further comprising, at the network node, transmitting the user data provided by the host for the UE.

40. The method of any of the previous 2 statements, wherein the user data is provided at the host by executing a host application that interacts with a client application executing on the UE, the client application being associated with the host application.

41. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B statements to transmit the user data from the host to the UE.

42. The communication system of the previous statement, further comprising:

the network node; and/or the user equipment.

43. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any of the Group B statements to receive the user data from a user equipment (UE) for the host.

44. The host of the previous 2 statements, wherein:

the processing circuitry of the host is configured to execute a host application, thereby providing the user data; and the host application is configured to interact with a client application executing on the UE, the client application being associated with the host application.

45. The host of the any of the previous 2 statements, wherein the initiating receipt of the user data comprises requesting the user data.

46. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any of the Group B statements to receive the user data from the UE for the host.

47. The method of the previous statement, further comprising at the network node, transmitting the received user data to the host.

The invention claimed is:

1. A method performed by a user equipment for uplink data transmission of uplink data to a network node, the method comprising:

selecting a transmission resource associated with a Synchronization Signal Block, SSB;

determining whether to select one or more further transmission resources associated with SSBs; and transmitting uplink data using the transmission resource and, if selected, the one or more further transmission resources;

wherein each of the one or more further transmission resources is associated with a respective SSB that is different from the SSB associated with the transmission resource.

2. The method of claim 1, wherein the one or more further transmission resources are selected responsive to a determination that an amount of uplink data for transmission exceeds the capacity of the SSB associated with the selected transmission resource.

3. The method of claim 1, wherein the user equipment is in a Radio Resource Control, RRC, inactive state.

4. The method of claim 1, wherein the uplink data transmission is a Configured Grant based Small Data Transmission, CG-SDT, and wherein the transmission resource and one or more further transmission resources are CG resources.

5. The method of claim 1, wherein the method further comprises the step of, prior to the step of selecting a transmission resource, preconfiguring the user equipment with Physical Uplink Shared Channel, PUSCH, resources for uplink data transmission.

6. The method of claim 1, wherein the SSBs associated with the transmission resource and/or one or more further transmission resources have a quality above a predetermined threshold.

7. The method of claim 1, wherein a maximum allowed time interval between the selected transmission resource and the latest of the one or more further transmission resources is defined.

8. The method of claim 7, wherein the uplink data is transmitted within the maximum allowed time interval.

9. The method of claim 7 further comprising sending, to the network node, a Buffer Status Report, BSR, containing information on an amount of uplink data for transmission.

10. The method of claim 9, wherein the BSR is sent:

in the SSB associated with the transmission resource; and/or in the first of the one or more SSBs associated with the further transmission resources to be sent; and/or in the last of the one or more SSBs associated with the further transmission resources to be sent within the maximum allowed time interval; and/or in any of the one or more SSBs associated with the further transmission resources other than the first SSB associated with the further transmission resources to be sent or the last SSB associated with the further transmission resources to be sent within the maximum allowed time interval.

11. The method of claim 7, wherein conditions for allowing transmission of uplink data using the SSB associated with the transmission resource and one or more SSBs associated with the further transmission resources within the maximum allowed time interval comprise one or more of:

a Timing Advance, TA, is valid before the transmission on the first of the SSB associated with the transmission resource and one or more SSBs associated with the further transmission resources to be transmitted; and the amount of uplink data to be transmitted is larger than the capacity of the SSB associated with the transmission resource; and the priority of the uplink data is above a predefined priority threshold.

12. The method of claim 1, further comprising indicating, to the network node, information relating to the further transmission resources to be used for transmitting uplink data.

13. The method of claim 12, wherein the indication comprises one or more of:

identifiers of the further transmission resources and/or associated SSBs to be used for transmitting the uplink data; and identifiers of future time periods to be used for uplink data transmissions; and information on CG configurations that will have subsequent uplink data transmissions; and information on further transmission resources and/or associated SSBs that will not have subsequent uplink data transmissions;

information on which SSB associated with the transmission resources have a quality above the predetermined threshold.

14. The method of claim 12, wherein the indication is sent in a Medium Access Control-Control Element, MAC-CE.

15. The method of claim 1, wherein the SSB associated with the transmission resources and one or more SSBs associated with the further transmission resources are selected from a set of SSBs preconfigured to support the uplink data transmissions.

16. A method performed by a network node for receiving uplink data transmissions from a user equipment, UE, the method comprising:

receiving, from the UE, an uplink data transmission using a Synchronization Signal Block, SSB, associated with a transmission resource, wherein the transmission resource associated with the SSB is selected by the UE; and receiving, from the UE, a further uplink data transmission using one or more further SSBs associated with one or more further transmission resources, wherein the one or more further transmission resources associated with the one or more further SSBs are selected by the UE;

wherein each of the one or more further transmission resources is associated with a respective SSB that is different from the SSB associated with the transmission resource.

17. The method of claim 16, further comprising receiving a buffer status report, BSR, from the user equipment.

18. The method of claim 16, further comprising receiving an indication of information relating to further transmission resources to be used for transmitting uplink data, from the user equipment.

19. A user equipment, UE, for uplink data transmission to a network node, comprising:

processing circuitry configured to cause the user equipment to:

select a transmission resource associated with a Synchronization Signal Block, SSB;

determine whether to select one or more further transmission resources associated with SSBs; and transmit uplink data using the transmission resource and, if selected, the one or more further transmission resources;

wherein each of the one or more further transmission resources is associated with a respective SSB that is different from the SSB associated with the transmission resource; and power supply circuitry configured to supply power to the processing circuitry.

20. A network node for receiving uplink data transmissions from a user equipment, UE, the network node comprising:

processing circuitry configured to cause the network node to:

receive, from the UE, an uplink data transmission using a Synchronization Signal Block, SSB, associated with a transmission resource, wherein the transmission resource associated with the SSB is selected by the UE; and receive, from the UE, a further uplink data transmission using one or more further SSBs associated with one or more further transmission resources, wherein the one or more further transmission resources associated with the one or more further SSBs are selected by the UE;

wherein each of the one or more further transmission resources is associated with a respective SSB that is different from the SSB associated with the transmission resource; and power supply circuitry configured to supply power to the processing circuitry.

* * * * *